United States Patent [19]

Daussan et al.

[11] Patent Number: 4,901,984

[45] Date of Patent: Feb. 20, 1990

[54] METHOD FOR COATING A METALLURGICAL VESSEL AND A COATING OBTAINED

[75] Inventors: Jean C. Daussan, Metz; Gérard Daussan; André Daussan, both of Longeville les Metz, all of France

[73] Assignee: Daussan et Compagnie, Woippy, France

[21] Appl. No.: 162,389

[22] PCT Filed: Jun. 10, 1987

[86] PCT No.: PCT/FR87/00208

§ 371 Date: Feb. 10, 1988

§ 102(e) Date: Feb. 10, 1988

[87] PCT Pub. No.: WO87/07545

PCT Pub. Date: Dec. 17, 1987

[30] Foreign Application Priority Data

Jun. 10, 1986 [FR] France .................. 86 08621

[51] Int. Cl.⁴ .................. G21B 7/06; B05D 7/22
[52] U.S. Cl. .................. 266/280; 427/226; 427/228; 427/236; 427/133; 427/135; 427/239; 427/419.1; 427/419.2; 427/419.7; 427/427
[58] Field of Search .................. 427/236, 228, 419.2, 427/419.1, 419.7, 133, 135, 226, 239, 427; 266/280

[56] References Cited

U.S. PATENT DOCUMENTS 4,339,115 7/1982 Daussan et al. .................. 266/280
4,750,717 6/1988 Pheasant et al. .................. 266/280

FOREIGN PATENT DOCUMENTS 1506506 4/1978 United Kingdom .................. 266/208
2131139 6/1984 United Kingdom .

OTHER PUBLICATIONS

*The American Heritage Dictionary of the English Language*, New College Edition, Houghton Mifflin Co., Boston, 1976. p. 1448.

*Primary Examiner*—Janyce Bell
*Attorney, Agent, or Firm*—Young & Thompson

[57] ABSTRACT

The coating for the metallurgical vessel (1) comprises a permanent refractory lining (2) and a refractory wearing layer (4) which is constituted by an aqueous slurry containing inorganic particles and a binder. The coating further comprises a waterproof layer (5) between the refractory lining (2) and the wearing layer (4). The coating serves to prevent water derived from the wearing layer from penetrating into the permanent lining.

5 Claims, 1 Drawing Sheet

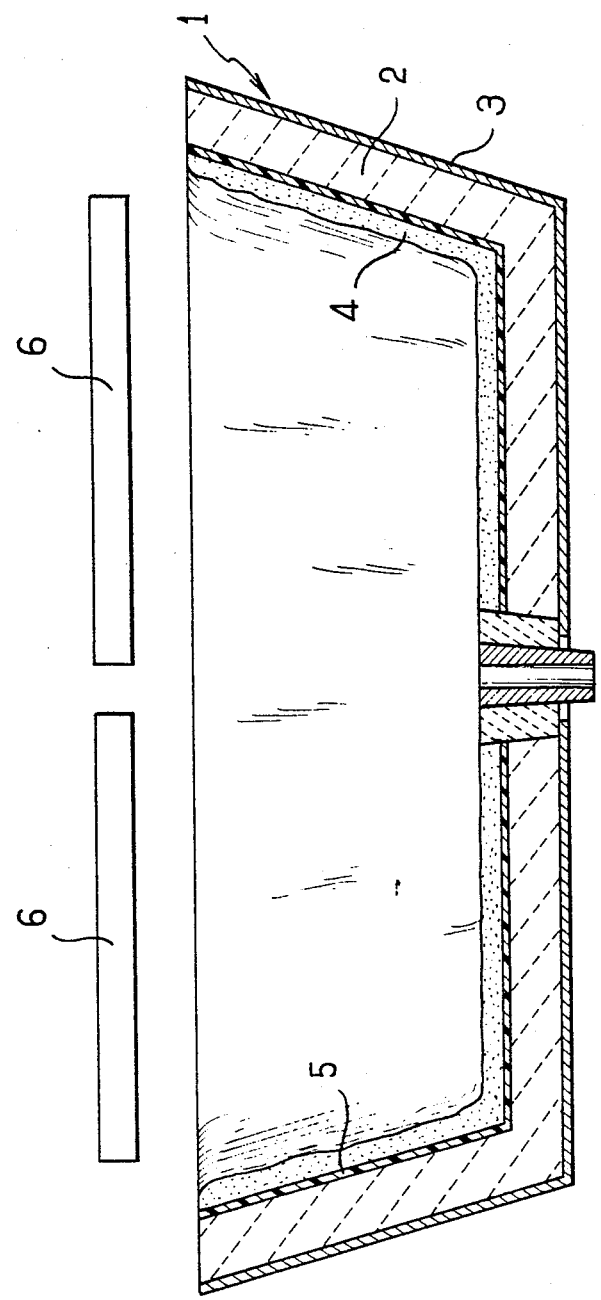

METHOD FOR COATING A METALLURGICAL VESSEL AND A COATING OBTAINED

The present invention relates to a method for coating a vessel which is intended to contain liquid metal and the walls of which are free of hydrogen. The invention is also concerned with the coating thus obtained.

It is known to prepare vessels for containing liquid metal by depositing on a permanent refractory lining a wearing coating which is applied in the form of an aqueous slurry containing inorganic particles and a binder. In this case, the mixture which constitutes the wearing coating contains a certain quantity of water which usually varies from 5 to 30%. This water may be necessary in order to permit setting of the binder and/or in order to facilitate the projection proper. Hardening of the wearing coating can take place in free air and at ambient temperature or by drying. Whatever solution may be adopted, this practice has the disadvantage of being conducive to introduction of water into the permanent lining by capillarity. The unfavorable consequences of this wetting of the permanent lining are as follows:

either the water thus absorbed does not succeed in escaping from the permanent lining and consequently has a potentially harmful effect on the steel which is contained within the vessel, or the water thus absorbed can be eliminated at the time of drying of the wearing coating, thus resulting in excessive and unnecessary energy consumption in order to permit extraction of the water thus accumulated in the permanent lining.

A vessel of this type such as, for example, a continuous-casting tundish which has the intended function of regularizing the ferrostatic pressure between a casting ladle and a continuous-casting ingot-mold is usually constituted by a metallic casing within which is applied a so-called permanent refractory lining on which is deposited by spraying, for example, a refractory coating known as a wearing coating. It is this wearing coating which comes into contact with the liquid metal. Permanent linings all have a certain porosity which facilitates absorption of water as soon as the moist wearing coating is applied on these latter. The quantity of water absorbed is greater as the permanent lining is more porous or cracked and the wearing coating has a higher moisture content at the time of deposition. Thus the time spent in drying all the layers is longer as the water content of the wearing coating is higher.

When the vessel is filled with liquid steel, for example over a fairly long period of time, the temperature of the entire assembly rises to a higher value than during the drying step. In consequence, the moisture trapped within the permanent lining in the vicinity of the metallic casing vaporizes, is put under pressure and diffuses into the liquid steel after having passed back through the different layers of refractory material, thus giving rise to explosions and to pollution of the liquid metal.

The vessel which is intended to contain liquid steel in accordance with the invention makes it possible to overcome these disadvantages.

In accordance with the invention, the method for coating the interior of a metallurgical vessel provided with a permanent refractory lining, in which there is deposited on said permanent lining a refractory wearing layer which is constituted by an aqueous slurry containing inorganic particles and a binder, is characterized in that a layer impenetrable to water is applied on the permanent lining prior to deposition of said wearing layer and that, after application of the wearing layer, all the layers are subjected to sufficient drying to remove the water and the compounds containing hydrogen.

By virtue of said layer impenetrable to water, the water of the wearing layer cannot penetrate into the permanent lining and the drying time is thus considerably reduced. Moreover, at the end of the casting operation, cleaning of the metallurgical vessel is facilitated by said layer impenetrable to water since this layer prevents any adhesion between the wearing layer and the permanent lining.

Those versed in the art were dissuaded from applying a layer impenetrable to water on the permanent lining prior to deposition of the wearing layer since this layer impenetrable to water is not only liable to introduce an additional amount of moisture but also supplies hydrogen which is contained in the majority of waterproofing or water-repellent products. Moreover, the interposition of this layer between the permanent lining and the wearing coating is liable to prevent adhesion of the two coatings to each other. Experience shows that the application of a film impenetrable to water which corresponds to a deposit of dry material of the order of 50 to 800 g per $m^2$ (in respect of a thickness of 0.025 mm to 0.4 mm approximately) of permanent lining does not in any way interfere with the structure consisting of the various layers.

In an advantageous embodiment of the invention, the layer impenetrable to water is a film of organic or inorganic material or a spray-deposited layer of organic or inorganic material impenetrable to water.

In a preferred embodiment of the invention, in the event that the layer impenetrable to water is of organic material, drying is performed at a temperature which is sufficient to decompose said organic material.

Thus, not only the liquid metal is not liable to be polluted by the hydrogen derived from said organic material but, in addition, after decomposition of this layer impenetrable to water, any adhesion between the wearing layer and the permanent lining is prevented.

Further particular features and advantages of the invention will also become apparent from the description given hereafter.

The accompanying FIGURE which is given by way of non-limitative example is a longitudinal sectional view of a casting tundish provided with a coating obtained in accordance with the invention.

With reference to the accompanying FIGURE, in the method for coating the interior of a metallurgical vessel 1 provided with a permanent refractory lining 2 which covers a metal casing 3, there is deposited on said permanent lining 2 a refractory wearing layer 4 which is constituted by an aqueous slurry containing inorganic particles and a binder. A wearing layer 4 of this type is described for example in French patent No. 2,393,637. The permanent lining 2 can be formed of refractory bricks or of refractory concrete.

In accordance with the invention, before depositing this wearing layer 4, a layer impenetrable to water 5 is applied on the permanent lining 2 and, after application of the wearing layer 4, the complete set of layers is subjected to sufficient drying to remove the water and the compounds containing hydrogen.

The layer impenetrable to water 5 can be a single-piece film of organic material such as a silicone resin, a butadiene-styrene copolymer, a polyvinyl alcohol, polyvinyl acetate and the like.

The layer impenetrable to water 5 can also be a spray-deposited layer of organic or inorganic material impenetrable to water such as a silicate, a colloidal silica to which oil may or may not be added, stearate and their mixtures.

In the event that the layer impenetrable to water 5 is of organic material, drying is carried out at a sufficient temperature (one hour at 700° C., for example) to decompose said organic material. In all cases, the drying operation is performed in known manner, for example by placing above the vessel 1 infrared elements 6 or gas burners so as to maintain the temperature to be obtained during a fixed period of time.

The thickness of the layer impenetrable to water 5 can be within the range of approximately 0.025 to 0.4 mm, the weight of dry material deposited being within the range of 50 to 800 g per $m^2$ approximately.

The waterproof layer 5 prevents the water derived from the spray-deposited wearing layer 4 from diffusing into the permanent refractory lining 2. Thus the time of subsequent drying of the wearing layer 4 is considerably reduced. If this drying operation is carried out at a sufficient temperature to decompose the layer 5, the hydrogen contained in this latter is prevented from polluting the liquid metal or from producing explosions.

As can readily be understood, the present invention is not limited to the examples of execution which have just been described and numerous modifications may be made in these latter without departing from the scope of the invention.

Thus the layer impenetrable to water 5 could be formed of paper or fabric which is treated so as to make it waterproof.

Similarly, the invention is applicable to metallurgical vessels other than continuous casting tundishes.

We claim:

1. Method for coating the interior of a metallurgical vessel (1) provided with a permanent refractory lining (2), in which there is deposited on said permanent lining (2) a refractory wearing layer (4) which is constituted by an aqueous slurry containing inorganic particles and a binder, characterized in that a layer (5) impenetrable to water and corresponding to a deposit of dry material of the order of 50 to 800 g per $m^2$ is applied on the permanent lining (2) prior to deposition of said wearing layer (4) and that, after application of the wearing layer (4), all the layers are subjected to sufficient drying to remove the water and the compounds containing hydrogen.

2. Method in accordance with claim 1, characterized in that the layer (5) impenetrable to water is a film of organic or inorganic material.

3. Method in accordance with claim 1, characterized in that the layer (5) impenetrable to water is a spray-deposited layer of organic or inorganic material impenetrable to water.

4. Method in accordance with claim 1, characterized in that, in the event that the layer (5) impenetrable to water is of organic material, drying is carried out at a sufficient temperature to decompose said organic material.

5. A metallurgical vessel (1) having on its interior a permanent refractory lining (2) and a refractory wearing layer (4) which overlies said lining (2) and is constituted by an aqueous slurry containing inorganic particles and a binder, characterized in that it includes a layer (5) impenetrable to water between the refractory lining (2) and the wearing layer (4).

* * * * *